Patented Aug. 24, 1926.

1,597,215

UNITED STATES PATENT OFFICE.

EARL P. STEVENSON, OF CAMBRIDGE, MASSACHUSETTS, ASSIGNOR TO ARTHUR D. LITTLE, INC., OF CAMBRIDGE, MASSACHUSETTS, A CORPORATION OF MASSACHUSETTS.

METHOD OF EXTRACTING TURPENTINE, PINE OIL, AND ROSIN.

No Drawing.    Application filed May 11, 1920. Serial No. 380,556.

The present invention relates to processes for the extraction of turpentine, pine oil and rosin from coniferous woods.

According to existing methods the wood is first prepared in suitable form for the extraction process, after which it is initially subjected to a distillation with steam to remove the turpentine and pine oil, and subsequently the remaining hydro-carbons are extracted with a hot petroleum solvent. This solvent extracts not only the rosin but also certain dark pitchy substances which are formed in the wood and which must be subsequently removed from the extraction solution if a merchantable grade of rosin is to be obtained. In practice this clarification of the extraction solution is secured by adding cold water to the hot solution which lowers the temperature of the solution to a point where the pitchy substances are precipitated and separated out of the solution with the water. Although this method produces a marketable grade of rosin yet there still remains a sufficient quantity of the pitch to seriously impair the quality and compel the grading of the rosin substantially below the pure gum rosin or a colophonium.

It has been discovered that the dark colored bodies which serve to impair the quality of the rosin result largely, if not wholly, from the initial steam distillation of the wood. Accordingly the present invention contemplates the complete extraction of the turpentine, pine oil and rosin from the wood with a solvent having a boiling point below that of turpentine and the subsequent recovery of the turpentine, pine oil and rosin separately from the extraction solution.

It has been discovered in addition that certain hydro-carbon solvents derived from coal tar, such as toluol, are particularly well suited for extraction purposes. This solvent has a substantially constant boiling point below that of turpentine, which simplifies and permits the subsequent separation of the elements by fractional distillation. Furthermore, the toluol is an especially good solvent for rosin so that in consequence a comparatively small volume of solvent is required per unit weight of rosin recovered.

It will be obvious to those skilled in the art that according to the present invention the complete extraction and subsequent separation of turpentine, pine oil and rosin may be accomplished without exceeding the temperatures at which the rosin undergoes appreciable decomposition. In consequence a clear, dry and merchantable form of rosin may be obtained which compares favorably with the best grades of pure gum rosin on the market.

According to one specific example of the new method the coniferous wood is subjected to the action of a toluol solution which may be heated to hasten the extraction. This treatment is continued until as complete an extraction as possible of the turpentine, pine oil and rosin is obtained. Subsequently the toluol is distilled off from the extraction solution without affecting the turpentine, pine oil or rosin. The removal of the toluol from the solution is a comparatively simple process inasmuch as the toluol boils within a substantially constant range well below the boiling point of turpentine.

The turpentine, pine oil and rosin remaining after the separation of the toluol are preferably separated by a process of vacuum distillation in accordance with well known principles, this process serving to maintain the temperature below a point at which the rosin undergoes appreciable decomposition.

If it is found desirable to clarify the extraction solution after the initial removal of the turpentine, pine oil and rosin from the wood this may be readily accomplished by the addition of hydrogen chloride prior to the removal of the solvent, as described in applicant's co-pending application, Ser. No. 380,557, filed May 11, 1920. The addition of the hydrogen chloride will precipitate out certain dark colored substances which may be present, leaving a supernatant solution of rosin, turpentine and pine oil.

Although the use of toluol as an extraction agent has been specifically mentioned, it is to be understood that the invention contemplates the use of certain other solvents which have a boiling point below that of turpentine.

I claim:

1. A process for extracting turpentine, pine oil and rosin from coniferous woods, which consists in subjecting the coniferous wood to treatment with a solution of a hydro-carbon solvent derived from coal tar having a boiling point below that of turpentine, to extract the turpentine, pine oil and rosin from the wood, treating with hydrogen chloride to precipitate certain dark colored bodies and subsequently separating the hydro-carbon solvent, turpentine, pine oil and rosin by distillation.

2. A process for extracting turpentine, pine oil and rosin from coniferous woods, which consists in subjecting the coniferous wood to treatment with a solution of a hydro-carbon coal tar distillate having a boiling point below that of turpentine, to extract the turpentine, pine oil and rosin from the wood, treating with hydrogen chloride to precipitate certain dark colored bodies and subsequently separating the solvent, turpentine, pine oil and rosin.

3. A process for extracting turpentine, pine oil and rosin from coniferous woods, which consists in extracting the wood with toluol, subsequently precipitating out certain dark colored bodies by a treatment with hydrogen chloride, separating the precipitate thus formed from the solution, and finally separating the toluol, turpentine, pine oil and rosin by distillation.

4. A process for extracting turpentine, pine oil and rosin from coniferous woods, which consists in extracting the wood with toluol, subsequently precipitating out certain dark colored bodies by a treatment with hydrogen chloride, neutralizing the excess of hydrogen chloride, and finally separating the toluol, turpentine, pine oil and rosin by distillation.

EARL P. STEVENSON.